US012064983B2

(12) United States Patent
Kuribara et al.

(10) Patent No.: US 12,064,983 B2
(45) Date of Patent: Aug. 20, 2024

(54) METHOD FOR FORMING COATING FILM ON RARE EARTH MAGNET SURFACE, AND RARE EARTH MAGNET

(71) Applicant: Shin-Etsu Chemical Co., Ltd., Tokyo (JP)

(72) Inventors: Yuta Kuribara, Echizen (JP); Kazuhito Akada, Echizen (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 616 days.

(21) Appl. No.: 16/623,919

(22) PCT Filed: Jun. 28, 2018

(86) PCT No.: PCT/JP2018/024640
§ 371 (c)(1),
(2) Date: Dec. 18, 2019

(87) PCT Pub. No.: WO2019/004368
PCT Pub. Date: Jan. 3, 2019

(65) Prior Publication Data

US 2021/0146709 A1 May 20, 2021

(30) Foreign Application Priority Data

Jun. 29, 2017 (JP) ................................ 2017-127661
Nov. 13, 2017 (JP) ................................ 2017-218124

(51) Int. Cl.

| | |
|---|---|
| ***B41M 5/00*** | (2006.01) |
| ***B05D 1/26*** | (2006.01) |
| ***B05D 3/06*** | (2006.01) |
| ***B41M 7/00*** | (2006.01) |
| ***C23C 26/00*** | (2006.01) |
| ***H01F 1/053*** | (2006.01) |
| ***H01F 7/02*** | (2006.01) |
| ***H01F 41/02*** | (2006.01) |

(52) U.S. Cl.
CPC ........ *B41M 5/0058* (2013.01); *B41M 5/0047* (2013.01); *B41M 7/0081* (2013.01); *C23C 26/00* (2013.01); *H01F 1/053* (2013.01); *H01F 7/0221* (2013.01); *H01F 41/0253* (2013.01); *H01F 41/026* (2013.01); *B05D 1/26* (2013.01); *B05D 3/067* (2013.01)

(58) Field of Classification Search
CPC .............. B41M 5/0058; B41M 5/0047; B41M 7/0081; C23C 26/00; H01F 1/053; H01F 7/0221; H01F 41/0253; H01F 41/026; B05D 1/26; B05D 3/067
See application file for complete search history.

(56) References Cited

U.S. PATENT DOCUMENTS

2003/0012948 A1* 1/2003 Miura .................. H01F 41/026 428/328
2012/0182103 A1* 7/2012 Miyabara ............. H01F 7/0221 335/302
2017/0062127 A1* 3/2017 Yi ...................... H01F 41/0266
2018/0154391 A1* 6/2018 Satou ..................... C23C 26/00

FOREIGN PATENT DOCUMENTS

JP 2-219206 A 8/1990
JP 03112103 A * 5/1991 ........... H01F 41/026
JP 3-255602 A 11/1991
JP 8-339917 A 12/1996
JP 2003-126760 A 5/2003
JP 2005-109209 A 4/2005
JP 2007-256097 A 10/2007
JP 2007-258250 A 10/2007
JP 2011-193621 A 9/2011
JP 2011-200763 A 10/2011
JP 2012-164964 A 8/2012
JP 2015-61328 A 3/2015
JP 2016-129249 A 7/2016

OTHER PUBLICATIONS

JP-03112103-A: Espacenet English machine translation (Year: 1991).*
Sigma Aldrich, "Trimethylolpropane propoxylate triacrylate", https://www.sigmaaldrich.com/US/en/product/aldrich/407577, webpage, accessed Jul. 2022 (Year: 2022).*
Handbook of Polymers; "VE vinyl ester resin", Handbook of Polymers, ChemTec Publishing, 2016, pp. 702-703 (Year: 2016).*
Pham et al.; "Epoxy Resins", Ullman's Encyclopedia of Industrial Chemistry, vol. 13, 2012, pp. 155-158, 182-183 (Year: 2012).*
Office Action dated Dec. 15, 2020, issued in counterpart JP Application No. 2019-527026, with English translation (7 pages).
International Search Report dated Oct. 2, 2018, issued in counterpart application No. PCT/JP2018/024640, w/English translation (5pages).

(Continued)

*Primary Examiner* — Adil A. Siddiqui
(74) *Attorney, Agent, or Firm* — WHDA, LLP

(57) ABSTRACT

Provided is a rare earth magnet, on the surface of which a coating film of an ultraviolet cured resin is formed by covering the surface of the rare earth magnet with an ultraviolet curable resin composition and subsequently curing the ultraviolet curable resin composition by irradiating the ultraviolet curable resin composition with ultraviolet light. With respect to this rare earth magnet, the coating film is formed by a method which comprises: a step for having droplets of the ultraviolet curable resin composition adhere to the rare earth magnet surface by ejecting the droplets of the ultraviolet curable resin composition from a tip of a head by an inkjet method wherein droplets are ejected from a head; and a step for curing the ultraviolet curable resin composition by irradiating the ultraviolet curable resin composition adhering to the rare earth magnet surface with ultraviolet light.

12 Claims, No Drawings

(56) References Cited

OTHER PUBLICATIONS

Written Opinion dated Oct. 2, 2018, issued in counterpart application No. PCT/JP2018/024640 (5pages).

Extended European Search Report dated Feb. 25, 2021, issued in counterpart EP Patent Application No. 18823841.4 (11 pages).

* cited by examiner

METHOD FOR FORMING COATING FILM ON RARE EARTH MAGNET SURFACE, AND RARE EARTH MAGNET

TECHNICAL FIELD

The invention relates to a method for forming a resin coating film on a surface of a rare earth magnet such as an Nd—Fe—B sintered magnet, and a rare earth magnet coated with a resin coating film on the surface of the rare earth magnet.

BACKGROUND ART

The Nd—Fe—B sintered magnet is obtained by press molding alloy powder and then sintering the molded alloy powder, however, the surface is easily corroded, and the magnetic properties tend to be deteriorated by the corrosion. As the application of the Nd—Fe—B sintered magnet, an electric motor for automobile, or the like can be mentioned. A rotor core of an electric motor has a configuration that a magnet is inserted into a slot of a laminated steel plate, and if the boundary between the laminated steel plate and the magnet are not insulated, there may be a case where an eddy current generated in the magnet flows out to the extent of another magnet inserted into a slot which is adjacent to each other via the laminated steel plate therebetween, and a relatively large loop eddy current may be generated. In addition, as the countermeasure against the eddy current in a magnet, there is a countermeasure that the magnet in a slot is divided into multiple magnets and the divided multiple magnets are used for the configuration, however, in a state that multiple magnets in a slot are in direct contact with one another, influence of the conduction between the magnets cannot be thoroughly excluded. Further, there is a problem that due to the heat loss or the deterioration of the magnetic properties, which is caused by the temperature rise of magnet due to the eddy current, the desired performance in an electric motor cannot be easily obtained.

In response to such a problem, the corrosion resistance and the insulation have been improved by forming a coating film on a surface of an Nd—Fe—B sintered magnet (for example, JP-A 2011-193621 (Patent Document 1)). Further, in JP-A 2015-61328 (Patent Document 2), it has been disclosed that in order to reduce the eddy current of a rotating electric machine rotor, insulating tape is wound around two permanent magnets arranged side by side in a width direction of a slot for a magnet, at two or more positions separated in a rotor axial direction of the permanent magnets, and the two permanent magnets are fixed by insulating tape and immobilized to connect to each other.

Various techniques are adopted for the surface treatment to be applied to an Nd—Fe—B sintered magnet depending on the purpose, and plating, resin coating, or the like is mentioned as the representative example. As the resin coating, spray coating, electrodeposition coating, or the like is generally performed. In a case of spray coating, it is common to use a thermosetting resin as a coating material, however, since spray coating is performed by spraying, a certain amount of a coating material becomes the loss without attaching to an object to be coated, therefore, there is a limit to the increase in the yield of the coating material. Further, in both cases of the spray coating and the electrodeposition coating, heating by a heater is required in order to dry and bake the coating material after the coating. A heat treatment furnace is generally used for the heating, however, it takes time to fix the coating material, and there is a problem of high energy consumption associated with the heating, and further, a large area is required for installing equipment such as a heat treatment furnace. For such a reason, in the conventional technique, the cost associated with the surface treatment of a magnet has tended to become higher.

As a surface treatment corresponding to such a problem, for example, in JP-A 2012-164964 (Patent Document 3), a film forming method using a UV curable resin is shown as a rust preventive coating method. In this method, a magnet body sucked by a sucking device is immersed in an uncured UV curable resin stored in a container to be coated with the UV curable resin, and then the coated magnet body is irradiated with UV light to form a UV curable resin coating film on a surface of the member. In this method, in coating with UV curable resin, the magnet body is immersed in a UV curable resin stored in a container for a predetermined time, and then the excess resin is shaken off and removed by rotating the adsorption device, and the UV irradiation is performed.

However, in this case, due to the centrifugal force of rotation, the UV curable resin is formed thick on the side away from the rotation axis, and it is difficult to form the coating film homogeneously over the entire coating surface. Therefore, a part with insufficient corrosion resistance or insulation may be formed, and in order to form a coating film so as not to form a part with insufficient corrosion resistance or insulation, a coating film that is thicker than necessary is formed in the other part, a waste in the UV curable resin material is caused, in particular, as for a magnet built in a rotor core of a motor, or the like, the volume of a magnet that can be built in a slot is reduced more than necessary, therefore, the performance of the motor may be deteriorated.

PRIOR ART DOCUMENTS

Patent Documents

Patent Document 1: JP-A 2011-193621
Patent Document 2: JP-A 2015-61328
Patent Document 3: JP-A 2012-164964

SUMMARY OF THE INVENTION

Problems to be Solved by the Invention

An object of the invention, which has been made under the above-mentioned circumstances, is to provide a method that is simple and performed at a low cost with using a compact device, and can form a coating film that imparts corrosion resistance and insulation to a rare earth magnet homogeneously on a surface of the rare earth magnet, and a rare earth magnet having a coating film formed by the method.

Means for Solving the Problems

Making extensive investigations to achieve the outstanding problems, the inventors have found that a coating film of a UV curable resin is formed on a surface of a rare earth magnet by attaching droplet of the UV curable resin composition to the surface of the rare earth magnet with the ejection of the droplet from a tip of a head by an inkjet system of ejecting the droplet from the head, and by curing the UV curable resin composition with the irradiation of the UV curable resin composition attached onto the surface of the rare earth magnet with UV light. As a result, a coating film that imparts corrosion resistance and insulation to a rare earth magnet can be efficiently formed on a surface of the rare earth magnet homogeneously by using a method that is simple and performed at a low cost, and further using a compact device, surface condition in configuration of a coating film formed by the method differs from a coating film formed by a prior art of spray coating, and thus have completed the invention.

Accordingly, the present invention provides a method for forming a coating film on a rare earth magnet surface and a rare earth magnet, as defined below.

[1]. A method for forming a coating film of a UV curable resin on a surface of a rare earth magnet by coating the surface of the rare earth magnet with the UV curable resin composition and irradiating the UV curable resin composition with UV light to cure the UV curable resin composition, the method comprising the steps of:

(A) attaching a droplet of a UV curable resin composition to a surface of a rare earth magnet by ejecting the droplet from a tip of a head by an inkjet system of ejecting the droplet from the head; and (B) curing the UV curable resin composition by irradiating the UV curable resin composition attached onto the surface of the rare earth magnet with UV light.

[2]. The method of [1], wherein in the step (A), droplets of a UV curable resin composition are sequentially ejected from a tip of a head while the tip is moved in the vicinity of a surface of a rare earth magnet to form a thin layer of the UV curable resin composition on a part or all of the surface of the rare earth magnet, the thin layer being formed by connecting the droplets of the UV curable resin composition, and then the step (B) is performed.

[3]. The method of [2], wherein in the step (A), droplets of a UV curable resin composition are sequentially ejected from a tip of a head while the tip is moved in the vicinity of a surface of a rare earth magnet to form a thin layer of the UV curable resin composition on part of the surface of the rare earth magnet, the thin layer being formed by connecting the droplets of the UV curable resin composition, and then the step (B) is performed, further, the steps (A) and (B) are sequentially repeated on a surface of the rare earth magnet, which has not been coated with the UV curable resin, to form a coating film of the UV curable resin overall the predetermined surface of the rare earth magnet.

[4]. The method of [1], wherein in the step (A), a droplet of a UV curable resin composition is ejected from a tip of a head, and the step (B) is performed on the droplet, the tip of the head is moved to an adjacent part of the UV curable resin in which the droplet has cured, and further, the steps (A) and (B) are sequentially repeated on a surface of the rare earth magnet, which has not been coated with the UV curable resin, while moving the tip of the head in the vicinity of the surface of the rare earth magnet to form a coating film of the UV curable resin on a part or all of the surface of the rare earth magnet.

[5]. The method of any one of [1] to [4], wherein the droplet of a UV curable resin composition attached onto a surface of a rare earth magnet is kept for 1 second or more without being irradiated with UV light, and then are irradiated with UV light.

[6]. A rare earth magnet comprising a coating film of a UV curable resin formed on a surface, the coating film formed by a method comprising coating the surface of the rare earth magnet with the UV curable resin composition and irradiating the UV curable resin composition with UV light to cure the UV curable resin composition, the method comprising the steps of:

(A) attaching a droplet of a UV curable resin composition to a surface of a rare earth magnet by ejecting the droplet from a tip of a head by an inkjet system of ejecting the droplet from the head; and (B) curing the UV curable resin composition by irradiating the UV curable resin composition attached onto the surface of the rare earth magnet with UV light.

[7]. A rare earth magnet comprising a rare earth magnet body and a resin coating film coating the rare earth magnet body, a surface of the coating film having an arithmetic average roughness Ra of 1.05 μm or more that is 20% or less of an average thickness of the coating film.

[8]. A rare earth magnet comprising a rare earth magnet body and a resin coating film coating the rare earth magnet body, the coating film has an average thickness of 8 μm or more, a surface of the coating film has a maximum height roughness Rz of 7 μm or more that is 87.5% or less of the average thickness of the coating film.

[9]. A rare earth magnet comprising a rare earth magnet body and a resin coating film coating the rare earth magnet body, the coating film has a density of 0.93 g/cm$^3$ or less.

Advantageous Effects of the Invention

According to the invention, a rare earth magnet having a coating film that imparts corrosion resistance, insulation, and the like is provided. The coating film is efficiently formed on a surface of the rare earth magnet homogeneously by using a method that is simple and performed at a low cost, and further using a compact device.

EMBODIMENT FOR CARRYING OUT THE INVENTION

Now the invention is described in detail.

In the invention, a surface of a rare earth magnet is coated with a UV (ultraviolet) curable resin composition, the UV curable resin composition coated on the rare earth magnet is irradiated with UV light (ultraviolet light) to be cured, and thus a coating film of the UV curable resin is formed on the surface of the rare earth magnet.

As the rare earth magnet, a sintered magnet such as an Nd—Fe—B sintered magnet, and a SmCo sintered magnet, or the like can be targeted. As the shape of the rare earth magnet, as described later, since an inkjet system of ejecting a droplet of a UV curable resin composition from a tip of a head is applied, a shape constituted by a plain face, a circumferential face, an elliptical circumferential face, and a curved face such as a part or all of a spherical surface or a part or all of an elliptic spherical surface is preferred, and a shape not having a concave part into which a head used in an inkjet system cannot enter is also preferred. Specific examples of the shape include a shape in a plate or columnar form having a cross section in a shape of a quadrangle such as rectangle, parallelogram, or trapezoid, and a shape in a plate or columnar form having a cross section in a shape of a part or all of a sector, and in consideration of the applicability of the inkjet system, a rectangular parallelepiped shape is particularly preferred.

In the method for forming a coating film according to the invention, a step (A) of attaching a droplet of a UV curable resin composition to a surface of a rare earth magnet by ejecting the droplet from a tip of a head by an inkjet system of ejecting droplet from the head; and a step (B) of curing the UV curable resin composition by irradiating the UV curable resin composition attached onto the surface of the rare earth magnet with UV light are included. The coating film formed on a surface of a rare earth magnet is formed for the purpose of imparting corrosion resistance to the rare earth magnet, imparting insulation to the rare earth magnet (increasing the electric resistance of the rare earth magnet), or the like.

The thickness (average thickness) of such a coating film is generally 3 μm or more, however, preferably 6 μm or more, more preferably 8 μm or more, particularly 10 μm or more, and preferably 20 μm or less, more preferably 18 μm or less, particularly 16 μm or less. In a case where the thickness of a coating film is thinner than the range, it may be difficult to impart sufficient corrosion resistance and insulation. On the other hand, in a case where the thickness of a coating film is thicker than the range, for example, when a coating film formed-magnet is to be mounted in IPM (Interior Permanent Magnet) rotary machine, the magnet must be placed into a space having a prescribed volume. Therefore, in such a case, when the thickness of a coating film becomes thicker, a volume of a magnet body (the portion except for a coating film and a primer layer etc.) is resulted in small, thus, the properties of the rotary machine may be deteriorated. According to the invention, for example, a rare earth magnet having sufficient electric resistance as a magnet for motor application can be obtained.

In the step (A), by an inkjet system of ejecting a droplet from a head, a droplet of a UV curable resin composition is ejected from a tip of the head to attach the droplet of the UV curable resin composition to a surface of a rare earth magnet. In general, a device to which an inkjet system is applied is known as an inkjet printer, and is a device that makes a coating material in a liquid state into a microdroplet and ejects the microdroplet to a surface of an object so that the microdroplet is directly attached. In addition to a device that prints ink on paper or the like, a device that ejects an uncured resin composition instead of ink and directly attaches the uncured resin composition to a surface of an object is also available on the market, and also in this case, it is usually called an inkjet printer. In the inkjet system, there are two types of inkjet systems, that is, there are a continuous-type inkjet system in which a coating material in a liquid state is always ejected, and an on-demand type inkjet system in which a coating material in a liquid state is ejected only when needed. Further, in the on-demand type inkjet system, there are two systems, that is, there are a piezo system in which a coating material in a liquid state is ejected by utilizing a piezoelectric element, and a thermal system in which a coating material in a liquid state is ejected by utilizing bubbles generated by heating. In the invention, the inkjet system is not particularly limited, and an on-demand type inkjet system in which miniaturization of a device is relatively easy is preferred, and since there may be a case where a UV curable resin composition is cured by heat, a piezo system is preferred.

By applying an inkjet system to the formation of a coating film on a surface of a rare earth magnet, microdroplet whose liquid amount is controlled can be attached onto a surface of a rare earth magnet sequentially at constant intervals along the surface of the rare earth magnet, therefore, a coating film having high homogeneousness can be formed. That is, in the inkjet system, for example, by adjusting the resolution (dot density of droplet), the liquid amount of droplet (amount of a resin composition), or the time (timing) from the attachment of droplet to the start of UV irradiation (start of curing), the generation of a part where the base of a rare earth magnet is exposed (part where the coating film has not been formed), which is easily generated due to the formation by spray coating, or the like; the uneven coating; and the like can be reduced. Therefore, it is easier to maintain the homogeneousness than that in a case of the formation by spray coating. Accordingly, when a coating film is formed by the forming method of the invention, in a rare earth magnet coated with the coating film, corrosion resistance defects and insulation defects, which are problematic in a defective part of the coating film (uncoated parts of pinholes or the like, or a thin part of the coating film) can be reduced. In addition, even in a case of forming a coating film by repeating the steps (A) and (B), peeling at a joining part between the cured UV curable resins is suppressed, and the physical stability of the coating film can be obtained.

In a case of printing an image with an inkjet printer, in order to ensure the high resolution, it is required to suppress the diffusion of a droplet of ink as much as possible in a process of ink spraying and curing. However, in the method for forming a coating film according to the invention, in order to obtain the homogeneousness of the coating film to be obtained after the formation, it is preferred that the droplet of a UV curable resin composition is ejected under the conditions different from those in the inkjet system used for image printing.

The resolution of the point (dot) to which a droplet of a UV curable resin composition is attached is preferably 300 dpi or more, and more preferably 600 dpi or more. By enhancing the resolution and micronizing the droplet, the unevenness of a surface of the coating film to be formed is further miniaturized, and the generation of uncoated parts of pinholes or the like can be suppressed. As the resolution is higher, the above-described effect becomes higher, but the productivity decreases because the number of times of the ejection of droplets per area increases. Accordingly, the upper limit of the resolution is generally 1,200 dpi or less, and preferably 900 dpi or less although not particularly limited thereto. In addition, only one droplet may be attached to one dot, or two or more droplets may be attached to one dot.

The liquid amount (volume) of a droplet is selected depending on the thickness of the coating film to be formed and the above-described resolution, and in consideration of the characteristics and productivity of the coating film to be formed, it is preferred that the liquid amount (volume) per droplet is 3 pL or more and preferably 6 pL or more, and 20 pL or less, and preferably 12 pL or less, particularly 10 pL or less. In addition, the viscosity of the UV curable resin composition for forming droplet is preferably 17 mPa·s or more and 27 mPa·s or less at 25° C. Further, for the purpose of improving the adhesion of the coating film, a primer layer may be formed on a surface of a rare earth magnet before a UV curable resin composition is attached onto the surface.

In the forming a coating film by the inkjet system according to the invention, a density of a coating film can be adjusted by controlling the above-mentioned resolution and/or liquid amount of a droplet. The density of coating film is preferably 0.93 g/cm$^3$ or less, more preferably 0.92 g/cm$^3$ or less. A high resolution causes a high density of coating film, however, in a case where the density of coating film is too high, the coating film has a large internal stress, thus, it may cause defects of coating film such as peeling and cracking etc. In views of density of coating film, the resolution of the point (dot) in which a droplet of a UV curable resin composition is attached is preferably (600 to 900) dpi×(600 to 900) dpi. On the other hand, the lower limit of the density of coating film is generally 0.89 g/cm$^3$ or more, and preferably 0.9 g/cm$^3$ or more. In a case where the density of coating film is to low, it may be difficult to obtain sufficient corrosion resistance and insulation. In addition, a density of coating film can be calculated with the thickness of the coating film formed within the prescribed area, and the used amount of ink (volume and density of ink) or the weight of coating film.

In the inkjet system, the control accuracy of a position where droplet is attached is high, therefore, there is no waste of the resin composition and not only the yield is high, but also when the droplets are ejected and attached, even if the rare earth magnets are adjacent to each other, a problem such that a resin composition is accumulated between the rare earth magnets to fix the rare earth magnets to each other as in spray coating is hardly caused.

In addition, in a case of forming a coating film by applying an inkjet system, the resin composition can be applied in a narrower work area by using a compact device as compared with that in a case of forming a coating film by spray coating. Further, as compared with the formation of a coating film by spray coating using a heat curing-type resin, a drying process and a heat treatment process are not required, and there is an advantage that the time required for curing the resin composition is short.
Moreover, as the drying process and the heat treatment process are not required, the power consumption is reduced, therefore, the running cost is also reduced.
Accordingly, the method for forming a coating film according to the invention, to which an inkjet system is applied, is a method with high productivity.

In the invention, a UV curable resin is used as a resin for forming a coating film. The UV curable resin is a resin that causes a photochemical reaction by energy of UV light and cures from liquid to solid in seconds. In the UV curable resin composition (uncured UV curable resin), a photopolymerizable compound (monomer or resin precursor) as the main component, a photopolymerization initiator, a colorant, an auxiliary agent, and the like are contained. As the photopolymerizable compound, for example, a radical-type acrylic monomer in which a double bond is cleaved and polymerized can be mentioned. Other than this, a cationic epoxy monomer, a cationic oxetane monomer, a cationic vinyl ether monomer, and the like can be mentioned, but not limited thereto. In the radical-type monomer, the photopolymerization initiator is decomposed by light and radicals are generated, the radicals are reacted with monomers and new radicals are generated, and thus the polymerization proceeds. As the photopolymerization initiator species in this case, aromatic ketone can be mentioned. In the cation-type monomer, the photopolymerization initiator is decomposed by light and acid is generated, the acid is reacted with monomers and a new cationic active species is generated, and thus the polymerization proceeds.
As the photopolymerization initiator species in this case, triallylsulfonium cation, hexafluorophosphate, or the like can be mentioned. As the colorant, for example, carbon black, or the like can be mentioned, and the carbon black contributes to the improvement of the visibility of a rare earth magnet after the formation of a coating film.

In the step (B), irradiation of a UV curable resin composition attached onto a surface of a rare earth magnet with UV light is performed to cure the UV curable resin composition. The UV ray is appropriately selected depending on the type of the UV curable resin composition to be used, and in general, a UV ray at a wavelength of around 200 to 380 nm can be used. Irradiation with UV light emitted from, for example, a mercury lamp, a UV-LED, a xenon lamp, or the like can be performed.

In the method for forming a coating film according to the invention, steps (A) and (B) can be performed, for example, as in the following embodiment (1) or (2).

(1) In the step (A), droplets of a UV curable resin composition are sequentially ejected from a tip of a head while the tip is moved in the vicinity of a surface of a rare earth magnet to form a thin layer of the UV curable resin composition on a part or all of the surface of the rare earth magnet, the thin layer being formed by connecting the droplets of the UV curable resin composition, and then the step (B) is performed. Herein, it is preferred that the thickness of the thin layer is 4 μm or more and more preferably 7 μm or more, and 22 μm or less and more preferably 18 μm or less. In this case, in the step (A), a thin layer of a UV curable resin composition is formed on part of a surface of a rare earth magnet, and then the step (B) is performed, further, the steps (A) and (B) are sequentially repeated on the surface of the rare earth magnet, which has not been coated with the UV curable resin, to form a coating film of the UV curable resin overall the predetermined surface of the rare earth magnet.

(2) In the step (A), a droplet of a UV curable resin composition is ejected from a tip of a head, and the step (B) is performed on the droplet. The tip of the head is moved to an adjacent part of the UV curable resin of which the droplet has cured, and further, the steps (A) and (B) are sequentially repeated on a surface of the rare earth magnet, which has not been coated with the UV curable resin, while the tip is moved in the vicinity of the surface of the rare earth magnet, to form a coating film of the UV curable resin on a part or all of the surface of the rare earth magnet.

The time (timing) from the attachment of a droplet on a surface of a rare earth magnet to the start of UV irradiation (start of curing) may be substantially almost at the same time as the attachment of droplet (for example, from immediately after the ejection of droplet to immediately after the attachment), and it is preferred that the droplet is kept for a certain period of time after the attachment of the droplet, and then irradiated with UV light. In this way, the curing can be started after waiting for the connection of droplets to each other due to the flow of the droplet(s) on the surface of the rare earth magnet, and the generation of in-plane variations in film thickness of a coating film to be formed, or the generation of a defective part (uncoated parts of pinholes or the like, or a thin part of the coating film) can be suppressed. In order to obtain this effect higher, although depending on the liquid amount of the droplet or the viscosity of the UV curable resin composition, it is effective that droplet of a UV curable resin composition, which has been attached onto a surface of a rare earth magnet, are kept for 1 second or more, and preferably 3 seconds or more without being irradiated with UV light, and then the droplet is irradiated with UV light.

In a case where a droplet is attached onto a surface of a rare earth magnet, and then irradiated with UV light substantially almost at the same time as the attachment, it is effective to arrange a UV irradiation unit as a part of a head or as a unit separate from the head, at a tip or in the vicinity of the head that ejects droplet of the UV curable resin composition. For example, by using a UV curable inkjet printer or the like to which a UV irradiation unit is arranged as a part of a head or as a unit separated from the head at a tip or in the vicinity of the head that ejects a droplet of the UV curable resin composition, the UV curable resin composition can be cured at a place where the droplet have been ejected from the head, therefore, it is not required to perform a drying process or a heat treatment process, which is performed in the formation of a coating film by spray coating, in another device, and this is advantageous. In addition, in this case, by controlling the timing of the irradiation with UV light, the droplet is kept for a certain period of time after the attachment of the droplet, and then can be irradiated with UV light, and irradiation with UV light can be performed without moving the head or after moving the tip of the head to an adjacent part of the UV curable resin composition to which the droplet has been attached.

On the other hand, in a case where droplets are attached onto a surface of a rare earth magnet, kept for a certain period of time, and then irradiated with UV light, in particular, in a case of the above-described embodiment (1), apart from an inkjet printer, a UV irradiation device such as a UV lamp may be separately arranged, and the step (B) may be performed by irradiating with UV light collectively droplets of a UV curable resin composition, or a thin layer of a UV curable resin composition, which has been formed by connecting the droplets of the UV curable resin composition, after being kept for a predetermined period of time as needed. In this case, the rare earth magnet may be irradiated with UV light without being removed from the inkjet printer, or although the efficiency decreases slightly, the rare earth magnet may be temporarily removed from the inkjet printer, and then irradiated with UV light.

The surface of a rare earth magnet is usually arranged in a direction perpendicular to the ejection direction of a droplet, for example, in a case where the rare earth magnet has a rectangular parallelepiped shape, although it is not necessarily to form a coating film on all of the six surfaces of the rare earth magnet, in order to form a coating film on all of the six surfaces, it is required to rotate the rare earth magnet five times. In the method for forming a coating film according to the invention, in both of the cases of ejecting a droplet of a UV curable resin composition from a tip of a head in the step (A), and of irradiating with UV light in the step (B), the surface of a rare earth magnet can be arranged so as to be inclined from a direction perpendicular to the ejection direction of a droplet. In a case where the rare earth magnet has a rectangular parallelepiped shape, by tilting the surface of the rare earth magnet, for example, by 45°, two surfaces can be treated at the same time. In a case where the surface of a rare earth magnet is arranged so as to be inclined from a direction perpendicular to the ejection direction of a droplet, the embodiment (2) is suitably applied.

A coating film is formed on a surface of a rare earth magnet by the method, surface condition in configuration of a coating film formed by the method absolutely differs from a coating film formed by a prior art of spray coating. In operation of spray coating, a liquid resin composition is sprayed such that the liquid resin composition spreads on a surface of a rare earth magnet, and a certain level of time is required before curing the liquid resin composition which has been sprayed. In the meantime, the liquid resin composition is flowed on the surface of a rare earth magnet and planarized. Thus, the coating film evaluated in the macroscopical sense (ex, in evaluation within a range of (1 mm×1 mm) or more) has a good planer shape. However, on the characteristics of spray operation, the spray coating has disadvantage in stability (uniformity) of spray condition. Thus, the coating film evaluated in the microscopical sense (ex, in evaluation within a range of about (10 μm×10 μm)) includes a portion formed roughly and is inferior in uniformity of the coating film.

Compared to the above, in the method for forming a coating film according to the invention, droplet can be attached to the surface of a rare earth magnet every droplets uniformly with regular intervals. Thus, the coating condition is high stable (uniform), and the coating film evaluated in the microscopical sense includes a very few of a portion formed roughly and is superior in uniformity of the coating film. Meanwhile, in the method for forming a coating film according to the invention, the resin composition is divided to droplets and resin composition can be cured in short time from the adhesion of the liquid resin composition. In some cases, the resin composition is proceeded to curing under the condition in which connections of each of droplets (integration and planarization of droplets) on the surface of a rare earth magnet has not been proceeded. Thus, the surface of coating film evaluated in the macroscopical sense has a relatively concavo-convex shape reflecting droplets shape. Particularly, it is considered that a surface of coating film has a more concavo-convex shape because it may be difficult to proceed the connections of each of droplets (integration and planarization of droplets) on the surface of a rare earth magnet under low resolution. A film-coated rare earth magnet is often used as the magnet bonded to other member. The rare earth magnet coated with the coating film has advantages in views of enhancement of adhesivity or reduction of adhesive amount because such a concavo-convex shape tends to contribute anchor effect when a film-coated rare earth magnet is used as the magnet bonded to other member.

According to the invention, a rare earth magnet including a rare earth magnet body and a resin coating film coating the rare earth magnet body and having an arithmetic average roughness Ra of 1.05 μm or more, preferably 1.1 μm or more, particularly 1.2 μm or more can be obtained. The arithmetic average roughness Ra is preferably 50% or less, more preferably 30% or less, particularly 20% or less of an average thickness of the coating film.

According to the invention, a rare earth magnet including a rare earth magnet body and a resin coating film coating the rare earth magnet body and having a maximum height roughness Rz of 7 μm or more, preferably 8 μm or more can be obtained. For example, a maximum height roughness Rz of 7 μm or more and of 87.5% or less of an average thickness of the coating film are accomplished when the average thickness of the coating film is 8 μm or more. Further, a maximum height roughness Rz of 8 μm or more and of 85% or less of an average thickness of the coating film are accomplished when the average thickness of the coating film is 10 μm or more. In addition, in consideration for the function as a coating film, a difference between an average thickness of the coating film and a maximum height roughness Rz is preferably 1 μm or more, more preferably 1.5 μm or more.

An arithmetic average roughness Ra and a maximum height roughness Rz of the coating film are preferably evaluated in target area within a range of (1 mm×1 mm) or more (1 $mm^2$ or more), preferably a range of (3 mm×3 mm) or more (9 $mm^2$ or more) and preferably satisfy the above-mentioned ratios in accordance with the evaluation in the target area.

EXAMPLES

Examples and Comparative Examples are given below by way of illustration and not by way of limitation.

Example 1

On the overall surfaces of an Nd—Fe—B sintered magnet having a rectangular parallelepiped shape (70 mm×7.3 mm×3.5 mm), a coating film of a UV curable resin was formed by using a UV-LED Curing Flathead Inkjet Printer UJF-6042 Mk II (manufactured by Mimaki Engineering Co., Ltd.). As the UV curable resin composition for forming droplets, a composition containing acrylic ester as the main component, hexamethylene diacrylate as a reactive diluent, a polymerization initiator, and carbon black as a colorant was used. The resolution was set to 600 dpi×600 dpi, and the amount of droplet was set to 6 pL. The coating film was formed for five Nd—Fe—B sintered magnet samples.

Droplets of a UV curable resin composition were sequentially ejected on the overall one surface (70 mm×7.3 mm) of an Nd—Fe—B sintered magnet while moving a tip of a head in the vicinity of the surface of a rare earth magnet to form a thin layer of the UV curable resin composition, the thin layer being formed by connecting the droplets of the UV curable resin composition, and then the tip of the head was returned to the ejection start position, and a coating film of a UV curable resin was formed by sweeping and irradiating with UV light in order of the attachment of the droplets. The time (retention time) from when the droplet of a UV curable resin composition is attached onto a surface of a rare earth magnet until when the attached droplet is irradiated with UV light was 20 seconds.

The average thickness in the whole of the formed coating film of the UV curable resin was measured by Linear Gage (manufactured by Mitutoyo Corporation), (same in the following measurements of average thickness). The average thickness was 15.5 μm. Besides, the arithmetic average roughness Ra and maximum height roughness Rz in the whole of the formed coating film of the UV curable resin were measured by 3D Measurement System VR-3000 (manufactured by KEYENCE CORPORATION), (same in the following measurements of Ra and Rz). The Ra was 1.316 μm and the Rz was 11.5 μm. Further, the density of the coating film was calculated with the forming area of coating film on the surface, the thickness of the coating film, and the used amount of ink. The density was 0.916 g/cm$^3$.

Example 2

A coating film of a UV curable resin was formed as same in Example 1 except the resolution was set to 600 dpi×900 dpi, and the average thickness, arithmetic average roughness Ra and maximum height roughness Rz were measured. The average thickness was 15.0 μm, the Ra was 1.253 μm, and the Rz was 10.8 μm, and the density was 0.915 g/cm$^3$.

Comparative Example 1

On the overall surfaces of an Nd—Fe—B sintered magnet having a rectangular parallelepiped shape (70 mm×7.3 mm×3.5 mm), a coating film of an epoxy resin was formed by spray coating using an air spray. As the uncured epoxy resin composition, a composition containing an epoxy resin as the main component, toluene as a solvent, kaolin as a pigment, and carbon black as a colorant was used. The coating film was formed for five Nd—Fe—B sintered magnet samples.

An epoxy resin composition was applied onto the overall one surface (70 mm×7.3 mm) of an Nd—Fe—B sintered magnet, after confirming that the overall surface of the Nd—Fe—B sintered magnet was covered with the epoxy resin composition, the applied epoxy resin composition was heated in an oven at 170° C. for 1 hour to be cured, and a coating film of the epoxy resin was formed.

The average thickness, arithmetic average roughness Ra and maximum height roughness Rz of the obtained coating film of the epoxy resin were measured as same in Example 1. The average thickness was 11 Ra was 1.01 μm, and Rz was 6.910 μm.

Next, a durability test was performed on each of the five samples obtained in Example 1, Example 2 and Comparative Example 1. As the durability test, an immersion test in automatic transmission fluid (ATF), and a thermal cycle test were performed. The immersion test was performed once under the conditions of 150° C. and a moisture content of 0.125% by weight for 1,500 hours, and in the thermal cycle test, a cycle of −40° C. to 150° C. was performed 300 times.

With respect to samples before and after the test, when the state of the coating film was visually observed, and the electric resistance of the coating film was measured with a resistance meter connected the circuit to be measured in a state pressurized to 7 MPa while sandwiching the coating film between electrodes, in any one of the five samples obtained in Example 1, Example 2 and Comparative Example 1, a defect such as peeling was not confirmed before and after the test. Further, in any one of the samples obtained in Example 1, Example 2 and Comparative Example 1, a significant change was not confirmed before and after the test in the electric resistance, however, in any one of the samples obtained in Example 1 and Example 2, the electric resistance was 1 MΩ or more, but among the samples obtained in Comparative Example 1, some samples had an electric resistance of less than 1 MΩ. From these results, it has been found that in the invention to which an inkjet method has been applied, oil resistance similar to that of the conventional spray coating can be obtained, and further higher electric resistance can be obtained as compared with that of the coating film formed by spray coating.

The invention claimed is:

1. A rare earth magnet comprising a rare earth magnet body and a coating film made of a cured resin of UV curable resin that is formed on a surface of the rare earth magnet body, wherein the coating film is composed of cured resins of which droplets of the UV curable resin have been cured, and has a density of 0.93 g/cm$^3$ or less, and the droplets are arranged to have a resolution of 600 dpi×600 dpi to 600 dpi×900 dpi.

2. The rare earth magnet of claim 1 wherein a surface of the coating film has an arithmetic average roughness Ra of 1.05 μm or more that is 20% or less of an average thickness of the coating film.

3. The rare earth magnet of claim 1 wherein the coating film has an average thickness of 8 μm or more, and a surface of the coating film has a maximum height roughness Rz of 7 μm or more that is 87.5% or less of the average thickness of the coating film.

4. The rare earth magnet of claim 1 wherein an average thickness of the coating film is 3 μm or more and 20 μm or less.

5. The rare earth magnet of claim 1 wherein the coating film has a density of 0.89 g/cm$^3$ or more.

6. The rare earth magnet of claim 5 wherein the coating film has a density of 0.92 g/cm$^3$ or less.

7. The rare earth magnet of claim 1 wherein the UV curable resin comprises at least one photopolymerizable compound selected from the group consisting of a radical acrylic monomer, a cationic epoxy monomer, a cationic oxetane monomer, and a cationic vinyl ether monomer.

8. The rare earth magnet of claim 1 wherein each of the droplets has a liquid amount of 12 pL or less.

9. The rare earth magnet of claim 8 wherein each of the droplets has a liquid amount of 3 pL or more.

10. The rare earth magnet of claim 9 wherein each of the droplets has a liquid amount of 6 pL or more.

11. The rare earth magnet of claim 1 wherein the UV curable resin has a viscosity of 17 mPa•s or more at 25° C.

12. The rare earth magnet of claim 11 wherein the UV curable resin has a viscosity of 27 mPa•s or less at 25° C.

* * * * *